R. L. GENTRY.
Filters.
No. 156,481.  Patented Nov. 3, 1874.
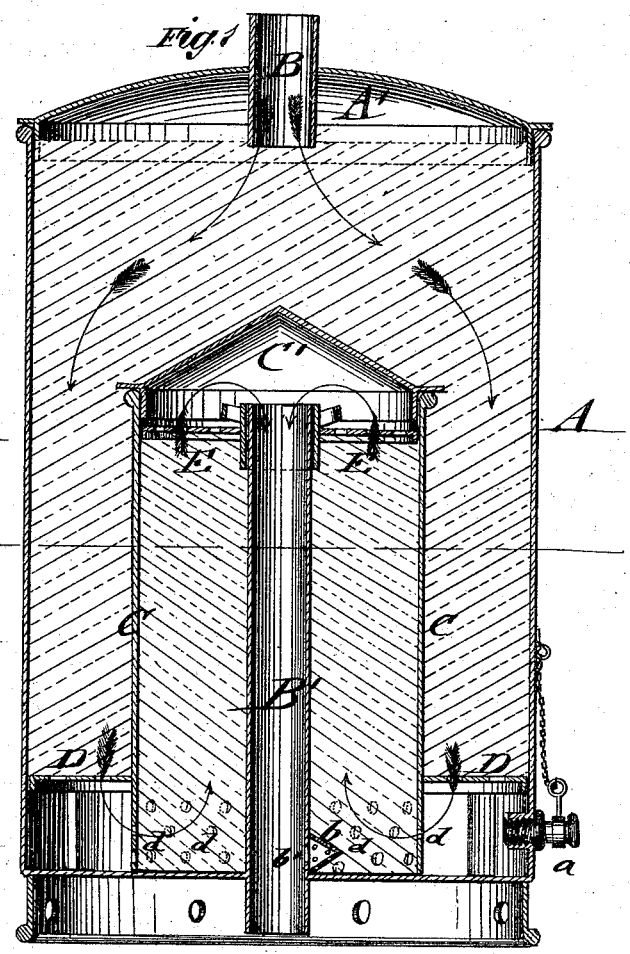
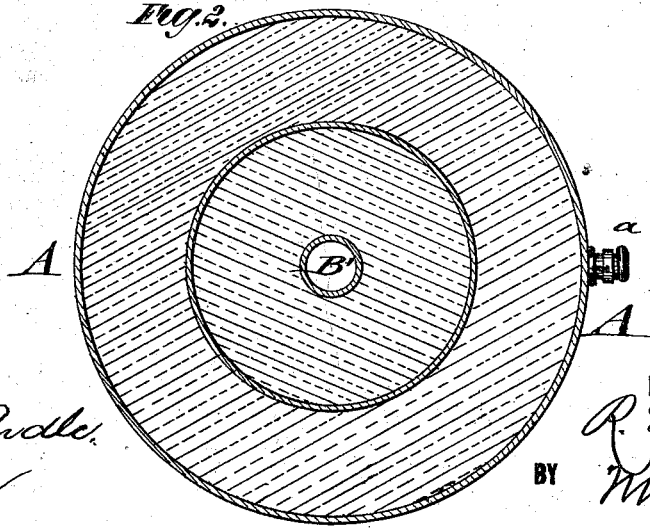
WITNESSES:  INVENTOR:
  BY
  ATTORNEYS.

UNITED STATES PATENT OFFICE.

RICHARD L. GENTRY, OF RICHMOND, KENTUCKY.

IMPROVEMENT IN FILTERS.

Specification forming part of Letters Patent No. 156,481, dated November 3, 1874; application filed May 23, 1874.

*To all whom it may concern:*

Be it known that I, RICHARD L. GENTRY, of Richmond, in the county of Madison and State of Kentucky, have invented a new and Improved Filter, of which the following is a specification:

In the accompanying drawings, Figure 1 represents a vertical central of my improved filter; and Fig. 2, a horizontal section of the same on the line $c\,c$ of Fig. 1.

Similar letters of reference indicate corresponding parts.

My invention relates to improvement in filtering apparatus, through which rain or other water is passed before being collected in the cistern or otherwise applied for use; and it consists of an outer and inner chamber filled with filtering material, to which the water is admitted by a supply-pipe passing through a perforated bottom of the outer chamber and side apertures of the inner chamber into the latter, rising therein until reaching the height of the central discharge-pipe, from which it is carried to the cistern or other place. A perforated outlet-hole of the discharge-pipe, near the bottom of the inner chamber, drains the filtering material from the remaining water, while a screw-spout of the outer chamber allows the cleansing of the filter from impurities.

In the drawing, A represents the outer vessel, preferably of cylindrical shape and galvanized iron, which is provided with a detachable top and enterance or supply-pipe, B, soldered centrally to the top. The discharge-pipe B' is soldered to a central aperture of the bottom of vessel A, and rises to suitable height therein. A metal screw-cap or faucet, $a$, near the bottom of vessel A, serves for washing out and driving off all impurities and sediments accumulating in the filter. A small perforated cone, $b$, surrounding an outlet-hole, $b'$, of the discharge-pipe B', near the bottom of vessel A, drains the filtering material completely from all water remaining therein after the main body thereof has been passed through, and obviates thereby all danger of freezing and bursting the filter. An interior tube, C, is placed around the discharge-pipe, resting on the bottom of the outer vessel, and forming therewith an inner and outer chamber. Tube C has side apertures $d$ at its lower part, and above the same and screw-cap $a$ a horizontal flange or rim, D, which extends to the periphery of vessel A and forms the bottom of the outer filtering-chamber. Tube C is filled with charcoal, pebbles, or other filtering material nearly up to the upper end of the discharge-pipe, to which is then attached a perforated disk, E, of the diameter of tube C. The cover of top C' is then placed on the tube C, and the space above and around the same in the outer chamber filled up completely with filtering material.

The rain or other water passes through the filter, as indicated by arrows in Fig. 1, from the discharge-pipe through the outer chamber to the perforated bottom thereof, and thence, through the side apertures to the inner chamber, rises by the pressure of the water in the same above the perforated disk, and over the discharge-pipe, and is then conducted off by the latter to the cistern or other place of use, being then completely cleansed from all impurities adhering thereto.

Having thus described my invention, I claim as new and desire to secure by Letters Patent—

1. As an improvement in filters for purifying rain and other water, the combination of outer filtering-chamber, having top supply-pipe and perforated bottom, with an inner filtering-chamber, provided with side apertures near bottom, and perforated disk at top, and with a central discharge-pipe, substantially as shown and specified.

2. The central discharge-pipe, provided with small perforated cone and aperture near bottom of filter for draining filtering-chambers from the remaining water after the main body has passed through, substantially for the purpose specified.

RICHARD L. GENTRY.

Witnesses:
WM. W. PIGG,
W. E. MYERS.